United States Patent [19]

Roche et al

[11] 4,272,844

[45] Jun. 9, 1981

[54] MULTIPLEX TIME DIVISION SWITCHING NETWORK UNIT OF THE TIME-TIME TYPE

[75] Inventors: Alain Y. Roche, Oliver F. Louvet, both of Lanion; Daniel J. Mell, Perros Guirec; Herva Le Bris, Pleumeur Boudou, all of France

[73] Assignee: Centre National d'Etudes de Telecommunication, Issy les Moulineaux, France

[21] Appl. No.: 54,238

[22] Filed: Jul. 2, 1979

[30] Foreign Application Priority Data

Jun. 30, 1978 [FR] France ............................ 78 19638
Apr. 12, 1979 [FR] France ............................ 79 09332
May 31, 1979 [FR] France ............................ 79 14062

[51] Int. Cl.³ .......................................... H04Q 11/04
[52] U.S. Cl. .................................. 370/66; 370/68
[58] Field of Search .................. 370/66, 68, 58, 64

[56] References Cited

U.S. PATENT DOCUMENTS 4,025,725  5/1977  Euler ................................. 370/66
4,167,652  9/1979  Braugenhardt et al. ............. 370/66

Primary Examiner—Douglas W. Olms
Attorney, Agent, or Firm—Abraham A. Saffitz

[57] ABSTRACT

Multiplex time division switching network unit comprising a plurality of P groups of N incoming and outgoing multiplex highways and P incoming and outgoing supermultiplex highways each formed of N multiplex highways and having 2aN time slots where a is the number of time slots in a multiplex highway. The supermultiplex highways are multiplexed two by two and with themselves to form double supermultiplex highways each having 2aN time slots. It results that there exists a double supermultiplex highway simultaneously containing any time slot assigned to a calling party and any time slot assigned to a called party whatever be these time slots. The buffer stores of the switching network unit can thus be rendered bidirectional and their number is $P(P+1)/2$ instead of $P^2$ in the prior art.

4 Claims, 20 Drawing Figures

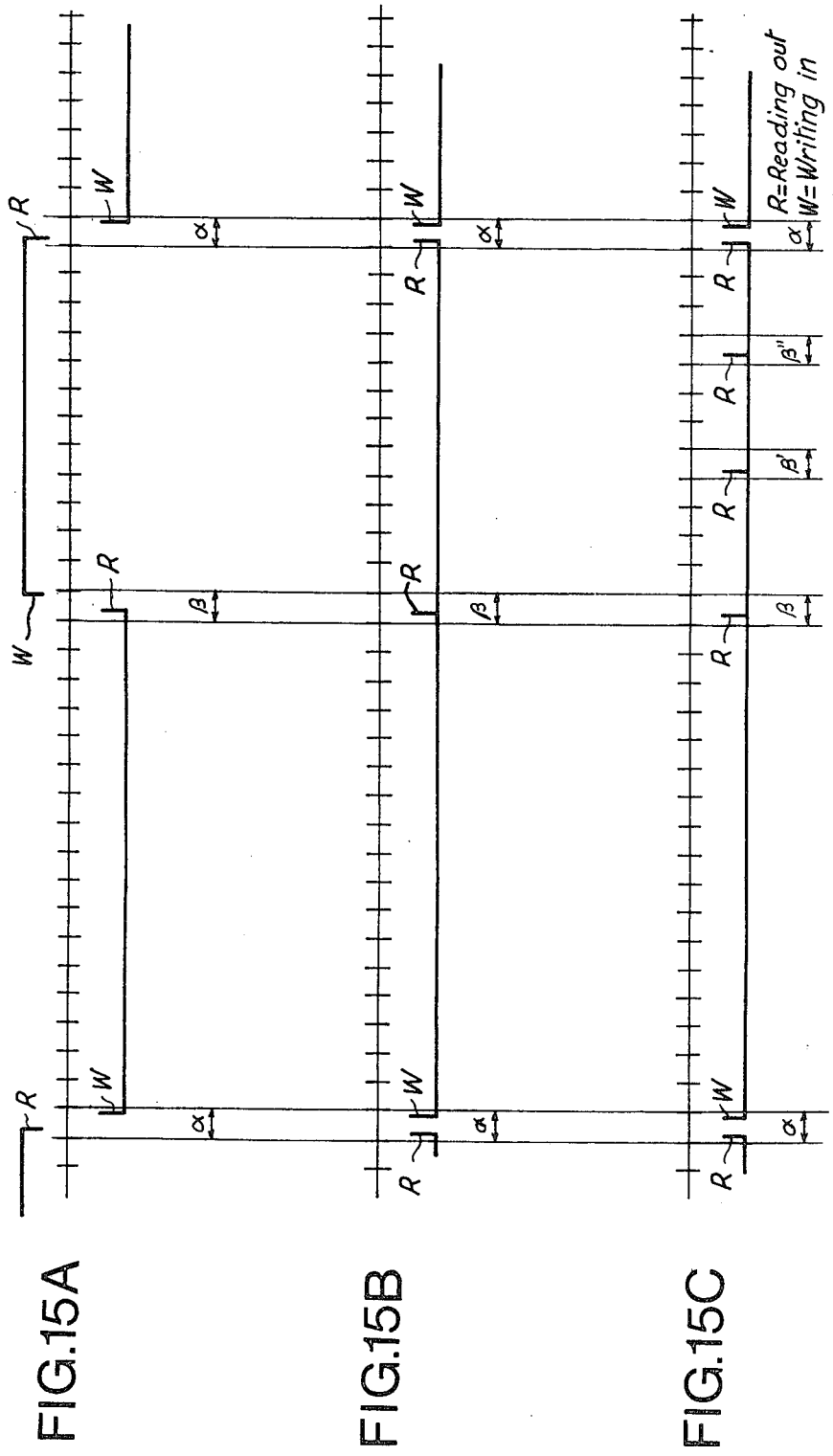

MULTIPLEX TIME DIVISION SWITCHING NETWORK UNIT OF THE TIME-TIME TYPE

BACKGROUND OF THE INVENTION

1. Field of the Invention

The present invention relates to a multiplex time division switching network and, more particularly, to a switching network of the type concerned having two time division stages, commonly called "TT" type.

2. Description of the Prior Art

The structure of an elementary multiplex time division switching network will first be reminded.

As it is well known, a multiplex time division switching network is an operator device which allows to transmit in whatever given order in the time slots of an outgoing multiplex highway information samples or words which are received in sequential order in the time slots of an incoming multiplex highway. This kind of operator device comprises a buffer store in which the words written in the time slots of the incoming multiplex highway are written in sequentially during a frame interval and a control store which controls the reading out of these words at times which correspond to the time slots of the outgoing multiplex highway which they are assigned to.

It is also well known that the multiplex time division switching networks can be input controlled or output controlled. In the multiplex time division switching networks which are output controlled, the word locations in the buffer store are assigned to the time slots of the incoming multiplex highway. In other words, the words are stored in the buffer store according to their serial order in the incoming multiplex highway. At each instant corresponding to a time slot of the outgoing multiplex highway, the control store sends to the buffer store an order to read out the word to be inserted into this outgoing multiplex highway time slot together with the address at which this word is to be read out in the buffer store. In the input controlled multiplex time division switching networks, the word locations in the buffer store are assigned to the time slots of the outgoing multiplex highway. At each instant corresponding to a time slot of the incoming multiplex highway, the control store sends to the buffer store an order to write in the word to be extracted from this incoming multiplex highway time slot together with the address at which this word is to be written in the buffer store.

Briefly, it can be said that, in the output controlled multiplex time division switching networks, writing in is cyclic while reading out is controlled by the control store and that, in the input controlled multiplex time division switching networks, reading out is cyclic while writing in is controlled by the control store.

Let us assume that time slot $t_i$ ($0 \leq i \leq k-1$) of the incoming multiplex highway is to be switched to time slot $t_j$ ($0 \leq j \leq k-1$) of the outgoing multiplex highway in a multiplex time division switching network controlled by its output. The buffer store has k word locations having each b bits, i.e. as many word locations as the highways have time slots. The control store has k word locations having each $\log_2 k$ bits. The buffer store has two addressing circuits, one for writing in the other for reading out. Each time slot $t_i$ is divided into two elementary time intervals $t_{i,w}$ and $t_{i,r}$. During $t_{i,w}$, the word located in time slot $t_i$ of the incoming multiplex highway is extracted from this time slot and written in the buffer store at address i. During $t_{i,r}$, the word located at address i in the buffer store is read out from the buffer store and transferred into time slot $t_i$ of the outgoing multiplex highway.

Therefore, the connection $t_i \rightarrow t_j$ is implemented in two steps. At time $t_{i,w}$, the word located in time slot $t_i$ of the incoming multiplex highway is written at address i in the buffer store and at time $t_{j,r}$, the word located at address j in the control store is read out and sent to the buffer store. This word is the very address i at which the word to be written in time slot $t_j$ of the outgoing multiplex highway is stored in the buffer store.

The connection $t_i \rightarrow t_j$ in an input controlled multiplex time division switching network can be derived without difficulty from the previous explanations.

If there are N incoming multiplex highways and N outgoing multiplex highways each having k=32 time slots, the capacity of the buffer store and control store must be of 32×N words and the rate of writing in and reading out operations is $$(2 \times 32 \times 10^6)/125 \; N = 512,000 \; N$$

if the frame duration is 125 μs. If N=32, this rate becomes equal to $16.4 \times 10^6$ operations per second.

It is possible to "supermultiplex" the N incoming multiplex highways and to "superdemultiplex" the N outgoing multiplex highways and provide a buffer store having a capacity of 32×N word locations. It is also possible neither to supermultiplex nor superdemultiplex the incoming and outgoing multiplex highways and provide N partial buffer stores having each 32 word locations, each partial buffer store being connected to a single incoming multiplex highway and to a single outgoing multiplex highway. Then N words can be simultaneously written into or read from the N partial buffer stores and the writing in and reading out operation rate becomes $$(1+N) \; (32 \times 10^6)/125 = 256,000 \; (1+N)$$

If N=32, this rate becomes equal to $8.4 \times 10^6$ operations per second.

An elementary multiplex time division switching network has the advantage of being without blocking, i.e. any time slot of any incoming multiplex highway can be switched to any time slot of any outgoing multiplex highway whatever may be the state of occupation of the other time slots. However, such a switching network has a limited capacity since the greater the number N of elementary highways the higher the operating rate of the buffer and control stores. Capacity is limited by technology. At the present time, one cannot exceed N=64 using fast memories implementing $16 \times 10^6$ operations per second, i.e. with a cycle of 62 ns.

The structure of a two time stage multiplex time division switching network will now be reminded.

Such a switching network is composed by an input stage and an output stage each comprising P elementary multiplex time division switching networks. Each elementary multiplex time division switching network is connected to an incoming supermultiplex highway formed by the supermultiplexing of N incoming elementary multiplex highways and to an outgoing supermultiplex highway which is demultiplexed into N outgoing elementary multiplex highways. The input elementary multiplex time division switching networks are connected to the output elementary multiplex time division switching networks through multiplex links having (32

N/P) time slots per frame. There are P multiplex links outgoing from each input elementary multiplex time division switching network and each of said multiplex links is connected to an output elementary multiplex time division switching network.

The elementary switching networks of the input stage are input controlled and the elementary switching networks of the output stage are output controlled. A connection between elementary channel i ($0 \leq i \leq 31$) of incoming elementary multiplex highway $IH_{n,p}$ ($0 \leq n \leq N-1$ and $0 \leq p \leq P-1$) and elementary channel j ($0 \leq j \leq 31$) of outgoing elementary multiplex highways $OH_{m,q}$ ($0 \leq m \leq N-1$ and $0 \leq q \leq P-1$) is implemented as follows:

The information word in time slot i of incoming multiplex highway $IH_{n,p}$ is transferred during the supermultiplexing operation into time slot $\alpha$ of the incoming supermultiplex highway of serial number p and is written at address ($\gamma$,q) in the buffer store of the input elementary switching network of serial number p which is input controlled. This buffer store address ($\gamma$,q) is supplied by the input control store at address $\alpha$ of the latter. The information word is read out during time slot $\gamma$ of the multiplex link connecting the input elementary switching network of serial number p to the output elementary switching network of serial number q. This reading out is cyclic and performed by a time base. The output elementary switching network is output controlled. The information word in time slot $\gamma$ of the multiplex link is written at address ($\gamma$,p) in the buffer store of this output elementary switching network under the control of the time base. The word in the buffer store is read out during time slot $\beta$ of the outgoing supermultiplex highway under the control of the output control store which contains ($\beta$,p) at its address $\beta$. Finally, the information word in time slot $\beta$ is transferred during the supermultiplexing operation into time slot j of outgoing multiplex highway $OH_{m,q}$.

The number of unit memories (bit memories) of a "time-time" multiplex time division switching network dealing with P groups of N incoming and outgoing time slots is $$2(13 + \log_2 N)$$

per elementary multiplex highway.

SUMMARY OF THE INVENTION

The general object of the invention is to significantly reduce the number of unit memories in a "time-time" multiplex time division switching netxork.

In the prior art "time-time" multiplex time division switching network which has just now been reminded, there is an imput buffer store, an output buffer store, an input control store and an output control store per group of N incoming and outgoing multiplex highways.

In the "time-time" multiplex time division switching network of the invention, there remain only one buffer store and one control store per group of N incoming and outgoing multiplex highways. Further the number of buffer stores is additionally and substantially reduced by making these buffer stores bidirectional and bringing them to operate two times in writing in and two times in reading out in each frame. If the calling party and the called party pertain the first to the group of serial number p and the second to the group of serial number q of elementary multiplex highways, the buffer store which performs the connection of the calling and called parties is unique and the word location in the buffer store is unique and the same for the two directions of the communication. In other words, there is a single buffer store for the direction of the communication going from the group of order p of elementary multiplex highways to the group of order q of elementary multiplex highways and for the direction of the communication going from the group of order q of elementary multiplex highways to the group of order p of elementary multiplex highways. The information word in a time slot of one of the elementary multiplex highways of the highway group of order p which is transferred to time slot $\alpha$ of the incoming supermultiplex highway is written in the buffer store at address $\gamma$ at time $\alpha$ and the information word in a time slot of one of the elementary multiplex highways of the highway group of order q which is transferred to time slot $\beta$ of the incoming supermultiplex highway is also written at address $\gamma$ of the buffer store at time $\beta$. The information word stored at the buffer store address $\gamma$ and intended to the time slot of one of the elementary multiplex highways of the highway group of order q which is to be transferred to time slot $\beta$ of the outgoing supermultiplex highway is read from the buffer store at time $\beta$ and the information word stored at the buffer store address $\gamma$ and intended to the time slot of one of the elementary multiplex highways of the highway group of order p which is to be transferred to time slot $\alpha$ of the outgoing supermultiplex highway is read from the buffer store at time $\alpha$.

The time slots $\alpha$ and $\beta$ are split into two parts for allowing time enough for a writing in and a reading out operations.

For carrying out the operations which have just been explained, it is necessary that time slots $\alpha$ and $\beta$ are comprised in the same supermultiplex highway. Therefore and according to a general feature of the invention, the supermultiplex highways which are P in number are multiplexed two by two in order to form double supermultiplex highways which are $P(P-1)/2$ in number. To provide for the case where the calling and the called parties pertain to the same group of elementary multiplex highways (that is where p=q), the supermultiplex highways are equally multiplexed with themselves in order to form double supermultiplex highways which are P in number. Therefore, the number of double supermultiplex highways is $$P(P-1)/2 + P = P(P+1)/2$$

More precisely, the incoming supermultiplex highway of serial number p and the incoming supermultiplex highway of serial number q (q being equal to or different from p) are multiplexed together at the input of the single bidirectional buffer store for giving an incoming double supermultiplex highway and the outgoing double supermultiplex highway is demultiplexed at the output of the single bidirectional buffer store to form two outgoing supermultiplex highways of respective serial numbers p and q.

BRIEF DESCRIPTION OF THE DRAWINGS

The invention will now be described in detail in relation with the accompanying drawings in which:

FIGS. 15A-15C shows a time diagram for explaining the operation of the switching network unit of FIG. 14.

Figure 1:
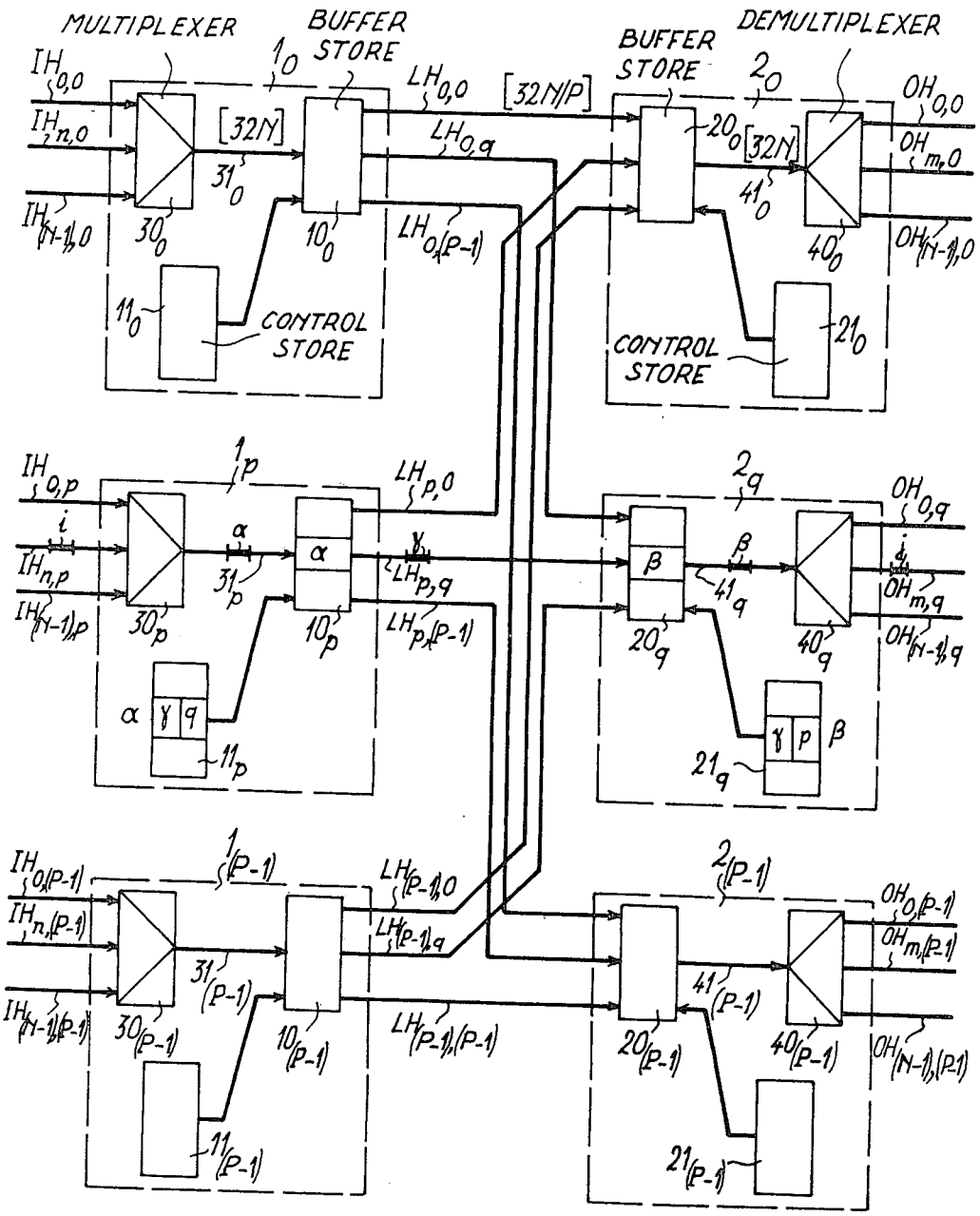
FIG. 1 represents a block diagram of a "time-time" multiplex time division switching network according to the prior art.

Referring first to FIG. 1 relative to the prior art, the input stage comprises the elementary multiplex time division switching networks $1_O$ to $1_{p-1}$ and the output stage comprises the elementary multiplex time division switching networks $2_O$ to $2_{p-1}$. Switching networks $1_O$ to $1_{p-1}$ include respective buffer stores $10_O$ to $10_{p-1}$ and respective control stores $11_O$ to $11_{p-1}$. Switching networks $2_O$ to $2_{p-1}$ include respective buffer stores $20_O$ to $20_{p-1}$ and respective control stores $21_O$ to $21_{p-1}$. The current incoming elementary multiplex highway is designated by $IH_{n,p}$ and the current outgoing elementary multiplex highway is designated by $OH_{m,q}$. The incoming multiplex highways $IH_{O,p}$ to $IH_{N-1,p}$ are multiplexed, through a supermultiplexer $30_p$, into an incoming supermultiplex highway $31_p$ which is connected to buffer store $10_p$. The outgoing supermultiplex highway $41_q$ issuing from buffer store $20_q$ is demultiplexed through a superdemultiplexer $40_q$ into outgoing multiplex highway $OH_{O,q}$ to $OH_{N-1,q}$. Each input switching network $1_p$ is connected to all the output switching networks $2_O$ to $2_{p-1}$ through multiplex links $LH_{p,O}$ to $LH_{p,P-1}$. The current multiplex link is designated by $LH_{p,q}$.

As already explained in the introductory part, a connection between time slot i in incoming elementary multiplex highway $IH_{n,p}$ and time slot j in outgoing elementary multiplex highway $OH_{m,q}$ is implemented in the following way:

The word in the incoming channel (i,n,p) (time slot i in multiplex incoming highway n of the group p connected to input elementary switching network $1_p$) is transferred to time slot $\alpha$ of incoming supermultiplex highway $31_p$ via input supermultiplexer $30_p$ and is written in input controlled buffer store $10_p$ at an address $(\gamma,q)$ thereof supplied by control store $11_p$ at address $\alpha$ of the latter. This word is read out thanks to a time base which scans cyclically the word locations in buffer store $10_p$ and is transferred to time slot $\gamma$ of multiplex link $LH_{p,q}$. It is written in buffer store $20_q$ at address $(\gamma,p)$ thereof thanks to a time base which cyclically scans the word locations in buffer store $20_q$. It is read out from output controlled buffer store $20_q$ at address $(\gamma,q)$ thereof supplied by control store $21_q$ at address $\beta$ of the latter and transferred to time slot $\beta$ of outgoing supermultiplex highway $41_q$ and the word in this time slot $\beta$ is transferred to time slot j of outgoing elementary multiplex highway $OH_{m,q}$.

In short for establishing connection (i, n,p)→(j, m, q) supermultiplexer $30_p$ makes the automatic, uncontrolled transfer:

(i, n, p)→α and superdemultiplexer $40_q$ makes the automatic, uncontrolled transfer: β→(j, m, q)

Control store $11_p$ makes the transfer: α→(γ, p, q) where (γ, p, q) is time slot γ in multiplex link $LH_{p,q}$ and control store $21_q$ makes the transfer: (γ, p, q)→β γ being comprised between 0 and $32(N/P)-1$.

Before the writing in control stores, it is necessary to find an idle time slot in the multiplex links for each direction of the communication.

Figure 2:
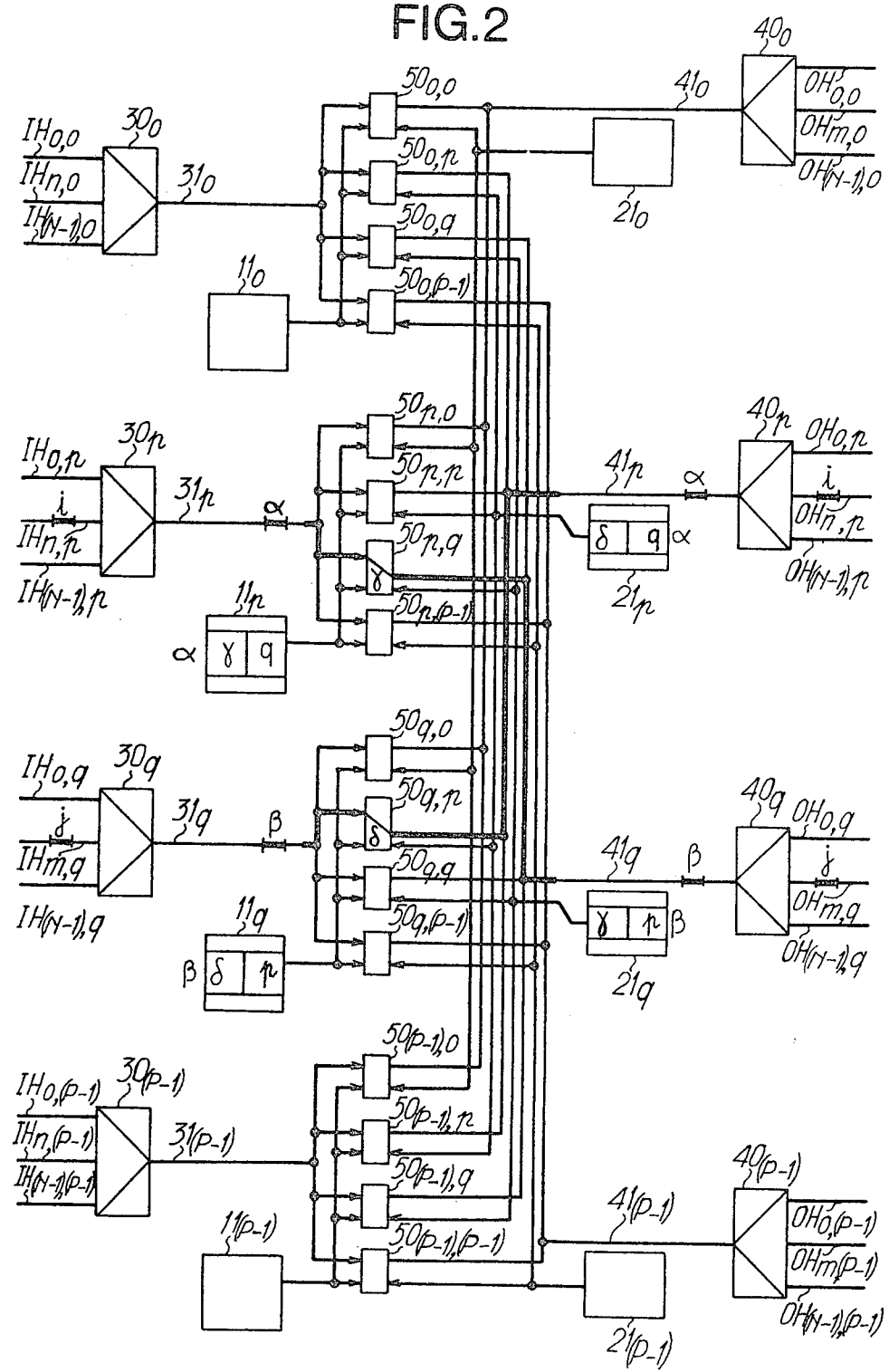
FIG. 2 is an explanatory block diagram showing how the switching network of the invention derives from the prior art by omitting one out of two buffer stores.

Referring now to FIG. 2, instead of having input buffer stores and output buffer stores, the multiplex time division switching network unit of the "TT" type only comprises one stage of buffer stores which are controlled by the input control stores as regards writing in and by the output control stores as regards reading out. Thus, the buffer stores are simultaneously input controlled and output controlled.

FIG. 2 shows again the input supermultiplexers $30_O$ to $30_{P-1}$ and the output superdemultiplexers $40_O$ to $40_{P-1}$, the input control stores $11_O$ to $11_{P-1}$ and the output control stores $21_O$ to $21_{P-1}$. There are now P groups of P buffer stores $50_{O,O}$ to $50_{O,P-1}$ all connected to supermultiplexer $30_O$ and control store $11_O$, . . . $50_{p,O}$ to $50_{p,P-1}$ all connected to supermultiplexer $30_p$ and control store $11_p$, . . . $50_{P-1,O}$ to $50_{P-1,P-1}$ all connected to supermultiplexer $30_{P-1}$ and control store $11_{P-1}$.

The buffer stores $50_{O,q}$, . . . $50_{p,q}$, . . . $50_{P-1,q}$ are connected to superdemultiplexer $40_q$ and control store $21_q$.

The operation is the following:

The information word in time slot i of the incoming elementary multiplex highway $IH_{n,p}$ is transferred by supermultiplexer $30_p$ to time slot $\alpha$ of incoming supermultiplex highway $31_p$. It is written at address (γ,q) in the buffer stores $50_{p,O}$ to $50_{p,P-1}$, i.e. at address γ in buffer store $50_{p,q}$ under the control of control store $11_p$ positioned on address α. Then it is read out at address (γ,p) of buffer store $50_{p,q}$ under the control of control store $11_q$ positioned on address β. Finally, superdemultiplexer $40_q$ transfer this information word from time slot β of the outgoing supermultiplex highway $41_q$ to time slot j of outgoing elementary multiplex highway $OH_{m,q}$.

For the reverse direction of the communication, the information word in time slot j of the incoming elementary multiplex highway $IH_{m,q}$ is transferred by supermultiplexer $30_q$ to time slot β of the incoming supermultiplexer highway $31_q$. It is written at address (δ,p) in the buffer stores $50_{q,0}$ to $50_{q,P-1}$, i.e. at address $\delta$ in buffer store $50_{q,p}$ under the control of control store $11_q$ positioned on address $\beta$. Then it is read out at address $(\delta,q)$ of buffer store $50_{q,p}$ under the control of control store $21_p$ positioned on address $\alpha$. Finally, superdemultiplexer $40_p$ transfers this information word from time slot $\alpha$ of the outgoing supermultiplex highway $41_p$ to time slot i of outgoing elementary multiplex highway $OH_{n,p}$.

The switching network of FIG. 2 is a "TT" type two stage multiplex time division switching network which only comprises a single buffer store for the two stages per each group of incoming and outgoing multiplex highways. These single buffer stores are each controlled by two control stores; they are input controlled for writing in and output controlled for reading out.

A multiplex time division switching network unit with only a single buffer store and only a single control store per group of incoming and outgoing multiplex highways will now be described in relation with FIG. 3. It will be said that the switching network unit has a "folded" control.

Figure 3:
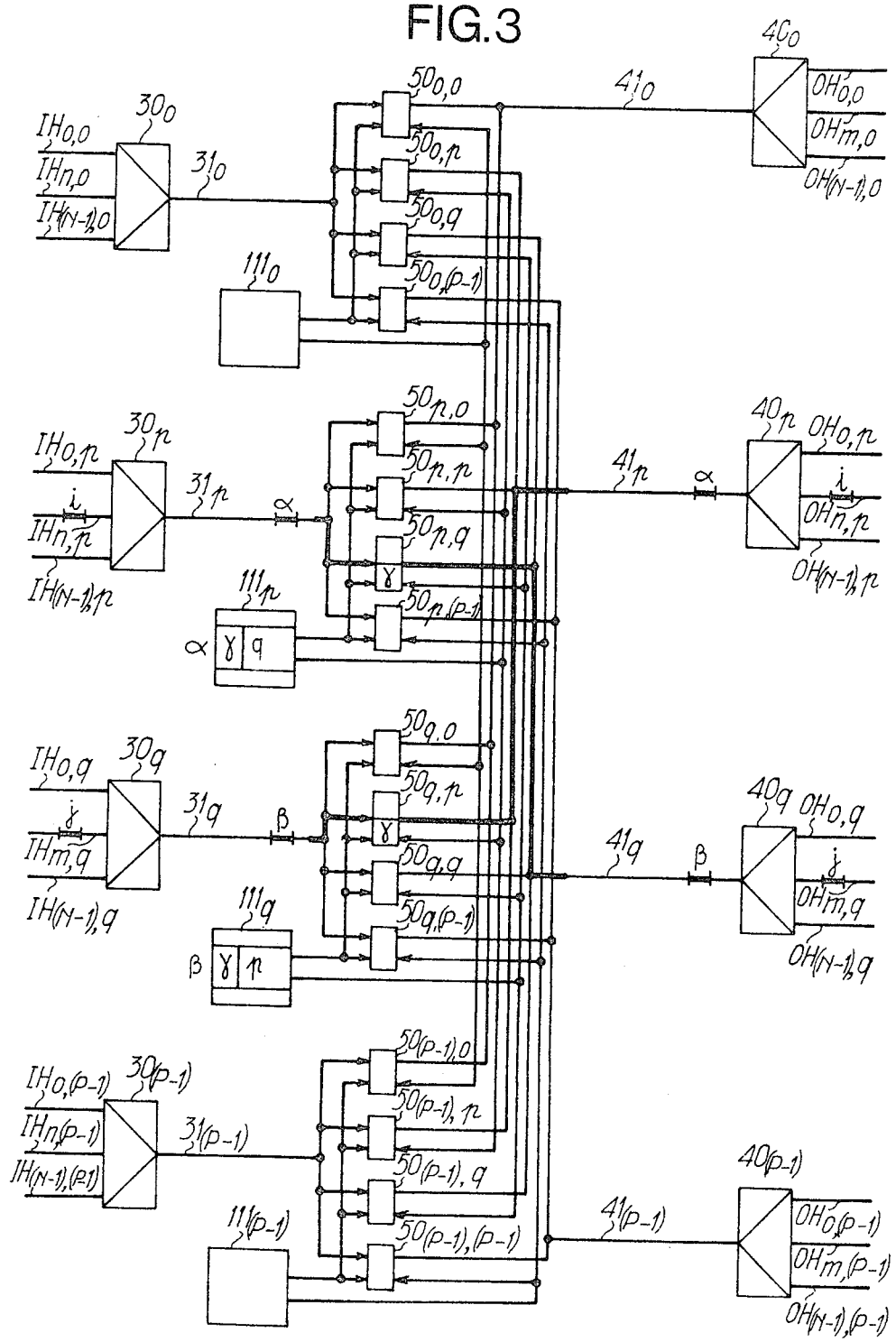
FIG. 3 is an explanatory block diagram further showing how the switching network of the invention derives from the prior art by omitting one out of two control stores.

In FIG. 3, the information word location $\gamma$ in buffer store $50_{p,q}$ for one direction of a bidirectional communication and the information word location $\delta$ in buffer store $50_{q,p}$ have the same address $\gamma = \delta$. It results that control stores $11_p$ and $21_p$ both contain at address $\alpha$ thereof the information $(\gamma,q)$ which designates the word location $\gamma$ in buffer store $50_{p,q}$ (out of buffer stores $50_{p,0}$ to $50_{p,P-1}$) or word location $\gamma$ in buffer store $50_{q,p}$ (out of buffer stores $50_{0,p}$ to $50_{P-1,p}$). In the same way, the control stores $11_q$ and $21_q$ both contain at address $\beta$ thereof the information $(\gamma,p)$ which designates the word location $\gamma$ in buffer store $50_{q,p}$ (out of buffer stores $50_{q,0}$ to $50_{q,P-1}$) or word location $\gamma$ in buffer store $50_{p,q}$ (out of buffer stores $50_{0,q}$ to $50_{P-1,q}$).

The control of the buffer stores can be summarized as follows:

| Control store | Address in control store | Buffer store address corresponding to control store address | Buffer store |
|---|---|---|---|
| $11_p$ | $\alpha$ | $(\gamma,q)$ | $50_{p,q}$ |
| $11_q$ | $\beta$ | $(\gamma,p)$ | $50_{q,p}$ |
| $21_p$ | $\alpha$ | $(\gamma,q)$ | $50_{q,p}$ |
| $21_q$ | $\beta$ | $(\gamma,p)$ | $50_{p,q}$ |

Referring to FIG. 3, it shows that the output control stores $21_O, \ldots 21_p, \ldots 21_q, \ldots 21_{P-1}$ have been omitted and that their part are played by input control stores $111_O, \ldots 111_p, \ldots 111_q, \ldots 111_{P-1}$ respectively. Each word in control store $111_p$ comprises (i) a number between O and (P−1) designating a buffer store $50_{p,q}$ out of those which it has access to for writing in and a buffer store $50_{q,p}$ out of those which it has access to for reading out and (ii) a number between 0 and $[32N/P-1]$ designating a word location in the buffer store. Assuming that the information words are octets, the number of unit memories that is the number of bit stores in the buffer stores is, for $P^2$ buffer stores each having a capacity of $32N/P$ octet locations:

$$8 \times 32(N/P) \times P^2 = 256\ NP$$

and the number of bit stores in the control stores is, for P control stores each having a capacity of 32 N words of each $\log_2 32(N/P)$ bits (words $\gamma$) and 32 N words of $\log_2 P$ bits:

$$32\ NP\ [\log_2(32\ N/P) + \log_2 P] \quad (1)$$
$$= 32\ NP[5 + \log_2 N]$$

The number of bit stores for all the buffer and control stores is $$32\ NP[13 + \log_2 N]$$

which corresponds for one elementary multiplex highway to:

$$13 + \log_2 N \quad (2)$$

Figure 4:
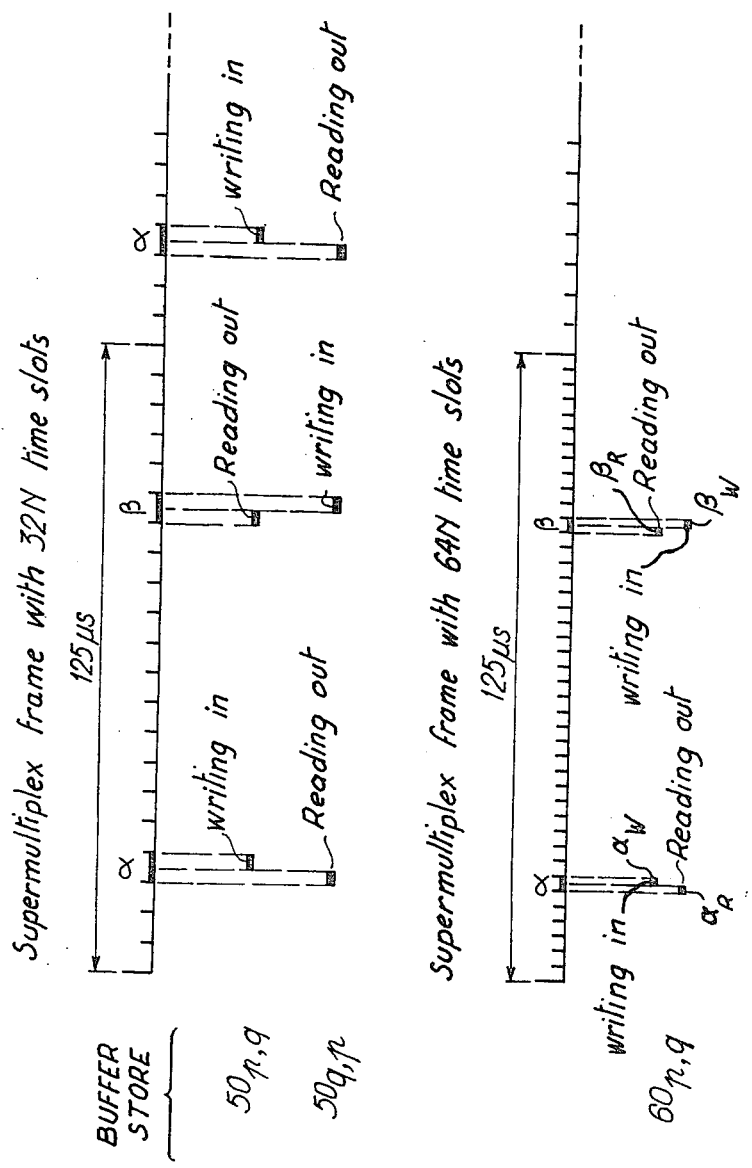
FIG. 4 is an explanatory time diagram representing the writing in and reading out operations in the buffer store.

Let us consider the buffer stores $50_{p,q}$ and $50_{q,p}$. We see in FIG. 4 that $50_{p,q}$ is controlled as regards writing in during time slot $\alpha$ and as regards reading out during time slot $\beta$, whereas $50_{q,p}$ is controlled as regards writing in during time slot $\beta$ and as regards reading out during time slot $\alpha$. The result is that it is possible to "confuse" buffer stores $50_{p,q}$ and $50_{q,p}$.

Figure 5:
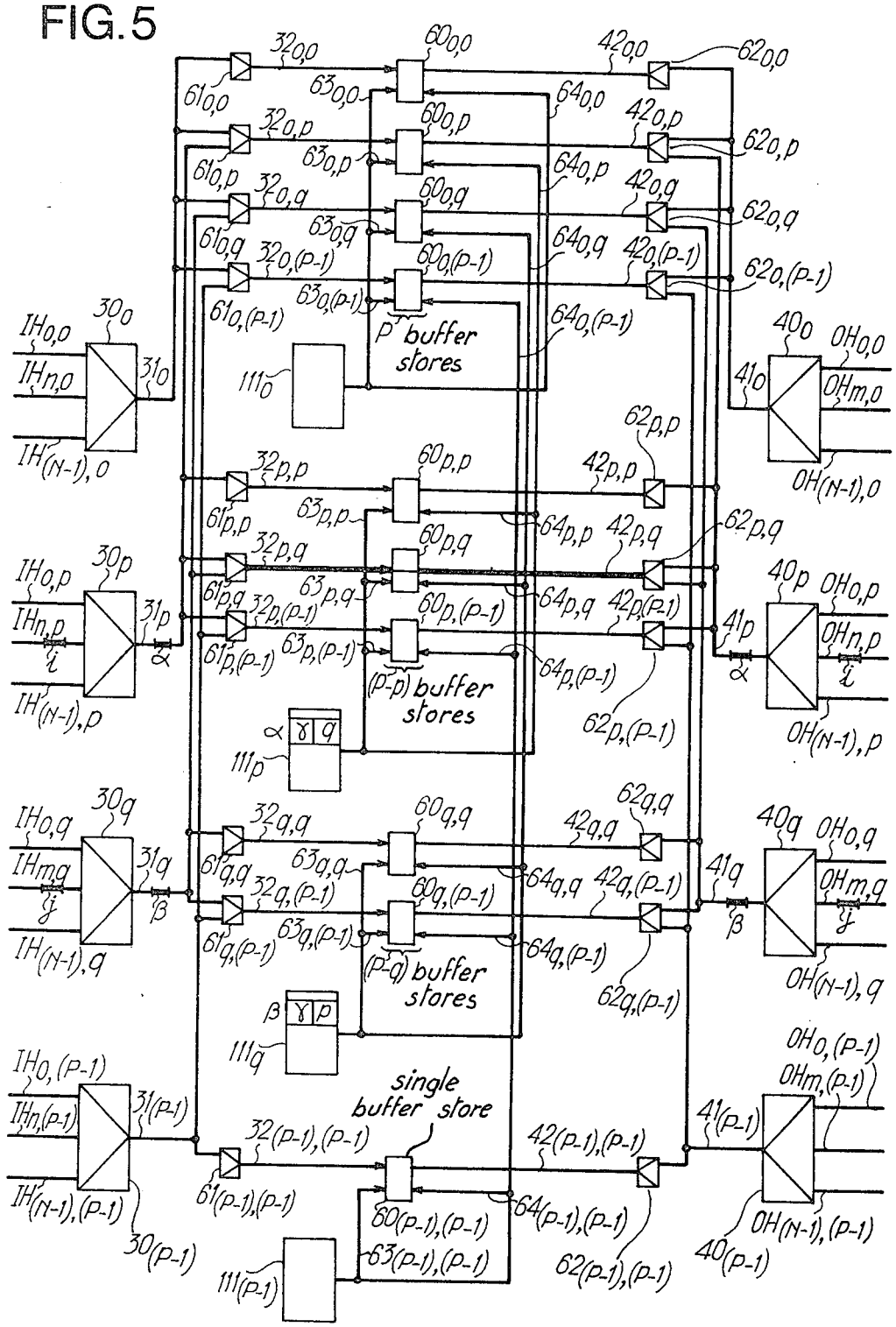
FIG. 5 represents a switching network unit according to the invention.

In FIGS. 2 and 3, there are $P^2$ unidirectional buffer stores connected to P incoming supermultiplex highways and P outgoing supermultiplex highways. In FIG. 5, according to the invention, the buffer stores are bidirectional and their number is reduced from $P^2$ to $P(P+1)/2$.

Referring now to FIG. 5, the incoming supermultiplex highway $31_O$ is connected to P buffer stores $60_{O,O}$ to $60_{O,P-1}$ through P supermultiplex highway selectors and multiplexers respectively $61_{O,O}$ to $61_{O,P-1}$ each having two inputs. The incoming supermultiplex highway $31_p$ is connected to (P−p) buffer stores $60_{p,p}$ to $60_{p,P-1}$ through (P−p) supermultiplex highway selectors and multiplexers respectively $61_{p,p}$ to $61_{p,P-1}$. The incoming supermultiplex highway $31_q$ is connected to (P−q) buffer stores $60_{q,q}$ to $60_{q,P-1}$ through (P−q) supermultiplex highway selectors and multiplexers $61_{q,q}$ to $61_{q,P-1}$. The incoming supermultiplex highway $31_{P-1}$ is connected to one buffer store $60_{P-1,P-1}$ through one supermultiplex highway selector and multiplexer $61_{P-1,P-1}$.

Each supermultiplex highway selector and multiplexer is connected to two distinct supermultiplex highways and multiplexes these two supermultiplex highways for giving a double supermultiplex highway. For example, multiplex highway selector and multiplexer is connected to multiplex highways $31_p$ and $31_q$ and forms the double supermultiplex highway $32_{p,q}$.

In FIG. 5, q is assumed to be greater than p. Therefore, buffer store $60_{p,q}$ exists but buffer store $60_{q,p}$ does not exist. The number of buffer store is $$P + (P-1) + \ldots + (P-p) + \ldots + (P-q) + \ldots + 2 + 1 = P(P+1)/2$$

The $P(P+1)/2$ selectors and multiplexers produce double supermultiplex highways each having 64 N time slots per frame. All the supermultiplex highways are multiplexed two by two and also each one with itself. It results that during each frame the information word located in time slot $\alpha$ assigned to the calling subscriber and included in incoming supermultiplex highway $31_p$ and the information word located in time slot $\beta$ assigned to the called subscriber and included in incoming supermultiplex highway $31_q$ are both contained in double supermultiplex highway $32_{p,q}$. If the words from the calling and called subscribers are contained in the same incoming supermultiplex highway $31_p$ it would not be theoretically necessary to provide for a double supermultiplex highway $32_{p,p}$ but this double supermultiplex is nevertheless formed in order for the buffer store not to operate at two different rates, one for the double supermultiplex highways and the other for the simple supermultiplex highways.

The buffer stores are also connected to outgoing double supermultiplex highways and the latter are demultiplexed into two supermultiplex highways by outgoing supermultiplex selectors and demultiplexers.

The P buffer stores $60_{O,O}$ to $60_{O,P-1}$ are connected to P outgoing double supermultiplex highways $42_{O,O}$ to $42_{O,P-1}$. The (P−p) buffer stores $60_{p,p}$ to $60_{p,P-1}$ are connected to (P−p) outgoing double stores highways $42_{p,p}$ to $42_{p,P-1}$. The (P−q) buffer stores $60_{q,q}$ to $60_{q,P-1}$ are connected to (P−q) outgoing double supermultiplex highways. Finally, the single buffer store $60_{P-1,P-1}$ is connected to single outgoing double supermultiplex highway $42_{P-1,P-1}$.

It is to be noticed that the incoming double supermultiplex highways 32, the outgoing double supermultiplex highways 42, the supermultiplex selectors and multiplexers 61, the supermultiplex selectors and demultiplexers 62 and the buffer stores 60 have reference numerals with two subscripts, the first subscript always being smaller than or equal to the second subscript.

The P control stores $111_O$ to $111_{P-1}$ are in all points identical to the control stores of the same reference numerals in FIG. 3.

The buffer stores 60 have two addressing terminals 63 and 64 for respectively writing in and reading out. Control store $111_p$ is connected to writing in addressing terminals $63_{p,p}, \ldots 63_{p,q}, \ldots 63_{p,P-1}$ and to reading out addressing terminals $64_{O,p}, \ldots 64$hd p,p, therefore to (P+1) terminals on the whole. Control store $111_q$ is connected to writing in addressing terminals $63_{q,q}, \ldots 63_{q,P-1}$ and to reading out addressing terminals $64_{O,q}, \ldots 64_{p,q}, \ldots 64_{q,q}$ therefore to (P+1) terminals on the whole. Finally, control store $111_{P-1}$ is connected to writing in addressing terminal $63_{P-1,P-1}$ and to reading out addressing terminals $64_{O,P-1}, \ldots 64_{p,P-1}, \ldots 64_{q,P-1}, \ldots 64_{P-1,P-1}$ therefore to (P+1) terminals on the whole.

Figure 6:
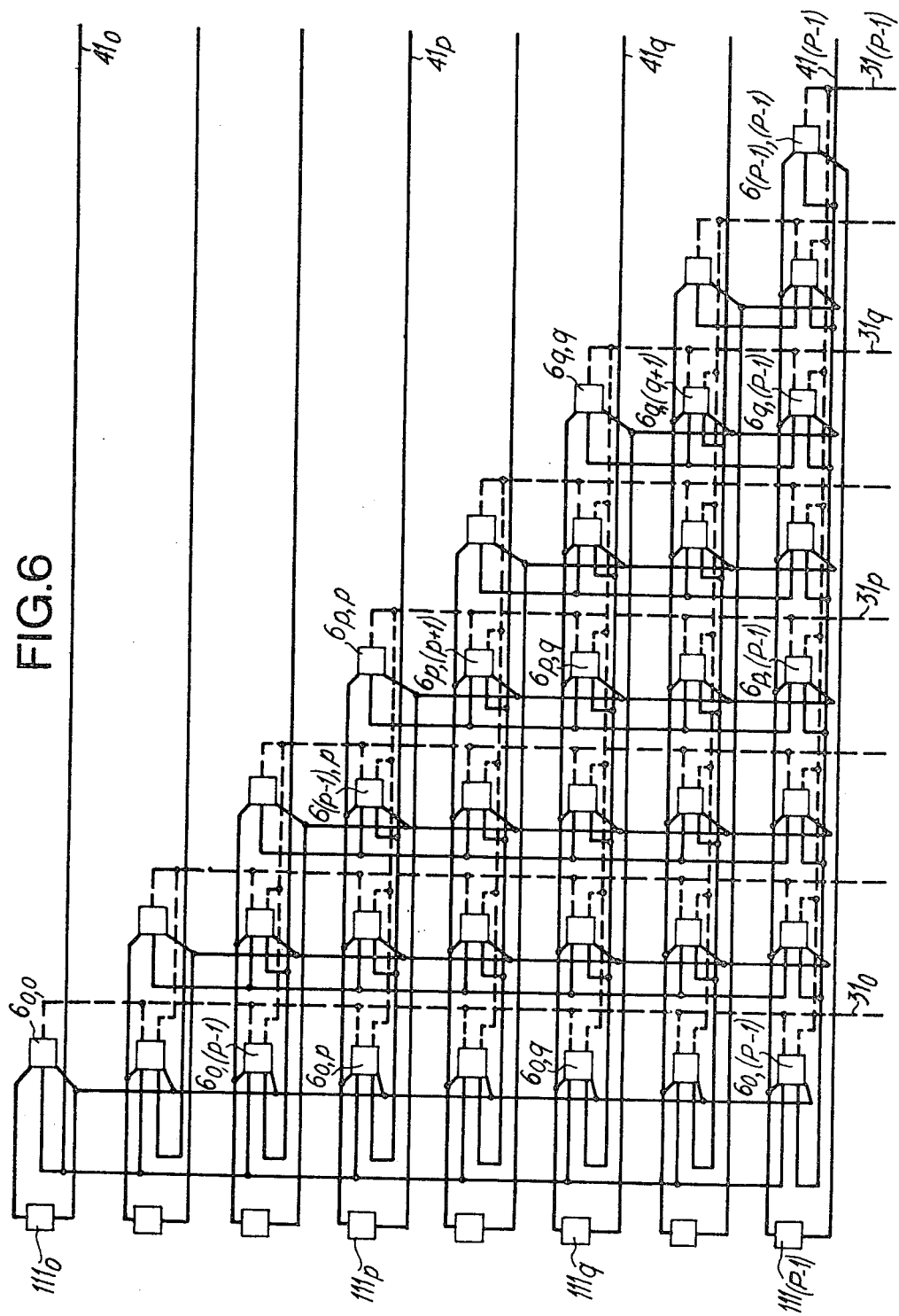
FIG. 6 is a block diagram representation of the switching network unit of FIG. 5.

FIG. 6 represents the switching network unit of FIG. 5 in a block diagram form in which the buffer store $60_{x,y}$, the selectors and multiplexers $61_{x,y}$ and the selectors and demultiplexers $62_{x,y}$ have been unified as a single block or module $6_{x,y}$.

It can be seen that the modules $6_{x,y}$ are disposed in an arrangement which resembles to half a square matrix with P rows and P columns retaining its diagonal terms. The diagonal modules $6_{x,x}$ are connected to one incoming supermultiplex highway $31_x$ and to one outgoing supermultiplex highway $41_x$ and the non-diagonal modules $6_{x,y}$ are connected to two incoming supermultiplex highways $31_x$ and $31_y$ and to two outgoing supermultiplex highways $41_x$ and $41_y$.

Each incoming supermultiplex highway $31_p$ is connected to p modules $6_{O,p}$ to $6_{p-1,p}$ situated along a matrix row, to a diagonal module $6_{p,p}$ and to (P−p−1) modules $6_{p,p+1}$ to $6_{p,P-1}$ situated along a matrix column. It is therefore connected to P modules. Each outgoing supermultiplex highway $41_q$ is connected to q modules $6_{O,q}$ to $6_{q-1,q}$ situated along a matrix row, to a diagonal module $6_{q,q}$ and to (P−q−1) modules $6_{q,q+1}$ to $6_{q,P-1}$ situated along a matrix column.

The operation of the switching network unit of FIGS. 5 and 6 will be now explained. Buffer store $60_{p,q}$ has 64 N time intervals per frame for the writing in operations and 64 N time intervals per frame for the reading out operations. The time intervals for writing in and reading out respectively are interleaved. Each time slot $\alpha$ in a double supermultiplex highway, $32_{p,q}$ ot $42_{p,q}$, is divided into a writing in time slot interval $\alpha_W$ and a reading out time slot interval $\alpha_R$.

During time slot $\alpha$, the octet in time slot $\alpha$ in the double supermultiplex highway $32_{p,q}$ is present at the input of buffer store $60_{p,q}$ and the addressing terminals $64_{p,q}$ and $63_{p,q}$ are successively operated. The octet in word location $\gamma$ of $60_{p,q}$ is transferred to time slot $\alpha$ in double supermultiplex highway $42_{p,q}$ during time interval $\alpha_R$; then the octet in time slot $\alpha$ of the double supermultiplex highway $32_{p,q}$ is transferred to word location $\gamma$ of $60_{p,q}$ during time interval $\alpha_W$. During time slot $\beta$, the octet in time slot $\beta$ in the double supermultiplex highway $32_{p,q}$ is present at the input of buffer store $60_{p,q}$ and the addressing terminals $64_{p,q}$ and $63_{p,q}$ are successively operated. The octet in word location $\gamma$ of $60_{p,q}$ is transferred to time slot $\beta$ in double supermultiplex highway $42_{p,q}$ during time interval $\beta_R$; then the octet in time slot $\beta$ of the double supermultiplex highway $32_{p,q}$ is transferred to word location $\gamma$ of $60_{p,q}$ during time interval $\beta_W$. Thus it appears that during a frame the word location $\gamma$ of $60_{p,q}$ is used two times for two different words:

$\alpha_R$ reading out of word No. 2
$\alpha_W$ writing in of word No. 1
$\beta_R$ reading out of word No. 1
$\beta_W$ writing in of word No. 2

The number of bit stores of the switching network unit of FIG. 5 can be deduced from the number of bit stores of the switching network unit of FIG. 3 by replacing in expression (1) $P^2$ by $P(P+1)/2$. One finds $$5 + 4(P+1)/P + \log_2 N \quad (3)$$

bit stores per multiplex highway which is to be compared with expression (2).

It is to be noticed that the supermultiplex highways $31_p$ and $31_q$ are multiplexed two by two in order to form double supermultiplex highways $32_{p,q}$ not only when $p \neq q$ which gives $C_P^2 = P(P-1)/2$ double supermultiplex highways but also when p=q which gives P double supermultiplex highways. Thus the number of double supermultiplex highways is:

$$C_P^2 + P = C_{P+1}^2 = P(P+1)/2$$

Figure 7:
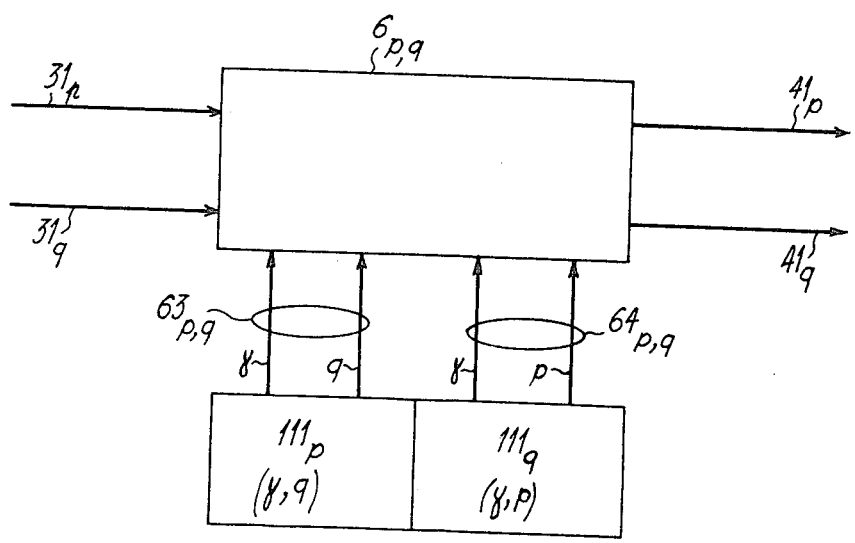
FIG. 7 represents in diagrammatic form a switching module.

FIG. 7 is a block diagram showing a block $6_{p,q}$ comprising a buffer store $60_{p,q}$, a supermultiplex highway selector and multiplexer $61_{p,q}$ and a supermultiplex highway selector and demultiplexer $62_{p,q}$. It is controlled by two control stores $111_p$ and $111_q$ through control leads $63_{p,q}$ and $64_{p,q}$ as already represented in FIG. 5.

Figure 8:
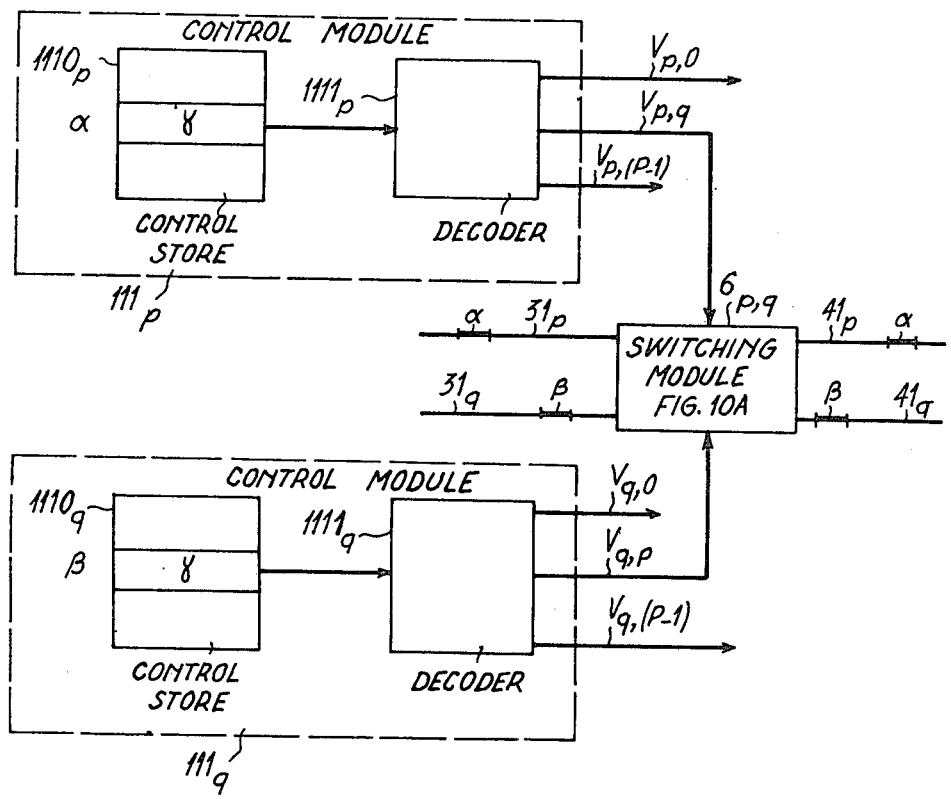
FIG. 8 represents a switching module and two control modules of the switching network of FIG. 5.

In FIG. 8, the control stores $110_p$ and $110_q$ are represented embodied in control modules $111_p$ and $111_q$. The control stores $110_p$, $110_q$ are connected to decoders respectively $1111_p$ and $1111_q$. The control modules send to the buffer module the address $\gamma$ of the word location together with a bit $V_{p,q}$ or $V_{q,p}$ the signification of which is the following one. If $V_{p,q}$ is equal to 1, the time slot $\alpha$ is supermultiplex highway $(31_p + 41_p)$ is to be switched into or from the buffer store. If $V_{q,p}$ is equal to 1, the time slot $\beta$ in supermultiplex highway $(31_q+41_q)$ is to be switched into or from the buffer store.

Figure 10A:
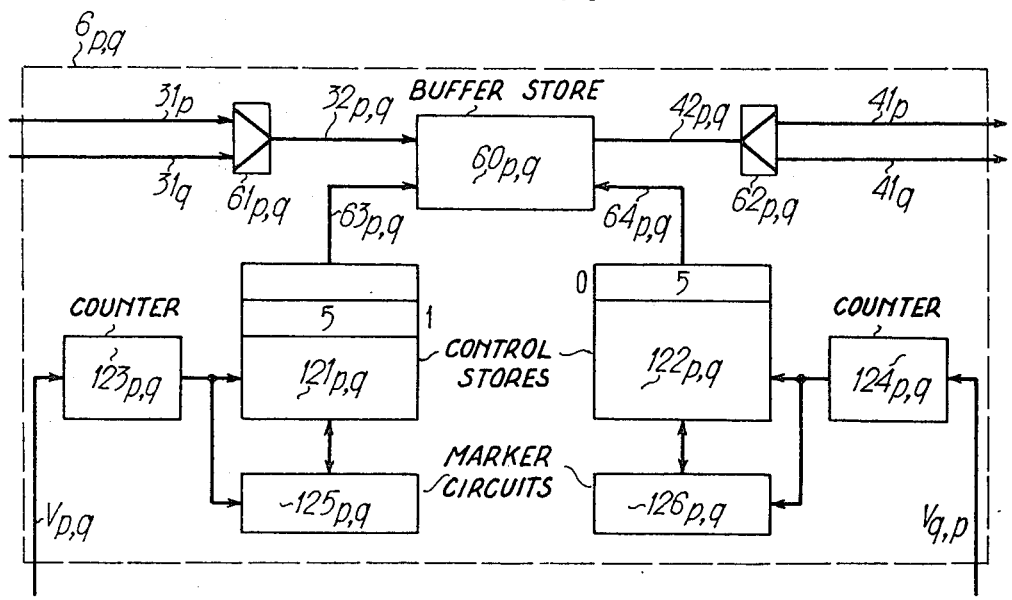
FIGS. 10A and 10B represent in block diagram form switching modules respectively adapted to two types of double supermultiplex highways.

FIG. 10A represents a switching module $6_{p,q}$ according to the invention. It comprises supermultiplex highway selector and multiplexer $61_{p,q}$, supermultiplexer highway selector and demultiplexer $62_{p,q}$, buffer store $60_{p,q}$, incoming supermultiplex highways $31_p$ and $31_q$, outgoing supermultiplex highways $41_p$ and $41_q$, incoming double supermultiplex highway $42_{p,q}$ already shown in FIG. 5. It also comprises two control stores $121_{p,q}$ and $122_{p,q}$ respectively associated to double supermultiplex highways $32_{p,q}$ and $42_{p,q}$ which each contain 32(N/P) words of $5+\log_2$ (N/P) bits, two counters $123_{p,q}$ and $124_{p,q}$ which address control stores $121_{p,q}$ and $122_{p,q}$ and two marker circuits $125_{p,q}$ and $126_{p,q}$ respectively associated to control stores $121_{p,q}$ and $122_{p,q}$.

Figure 10B:
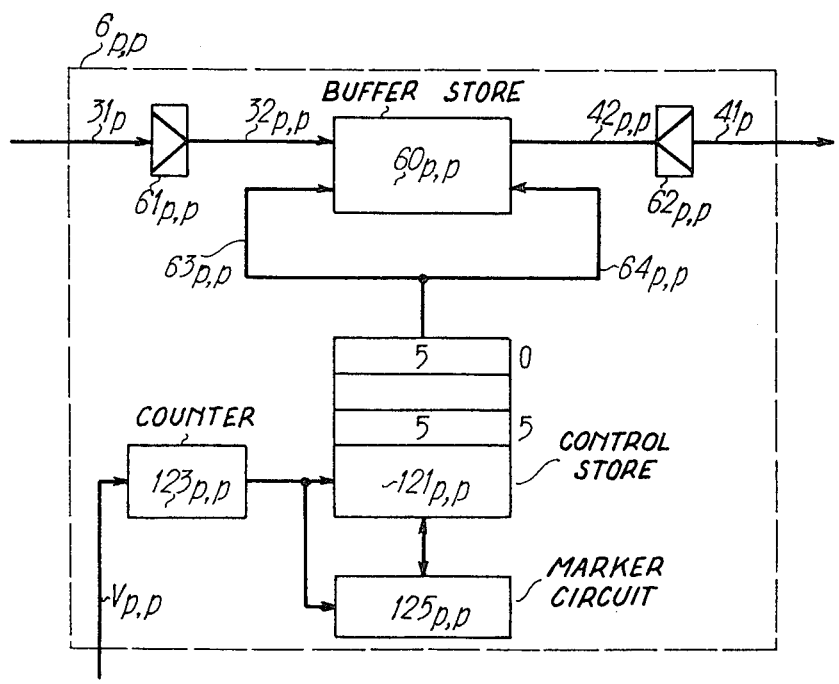

FIG. 10B represents a switching module $6_{p,p}$ similar to that of FIG. 10A but intended for the case where P=q. The switching module is then controlled by a single control module $111_{p,p}$. Switching module $6_{p,p}$ only comprises a single control store $121_{p,p}$, a single counter $123_{p,p}$ and a single marker circuit $125_{p,p}$.

The operation of control stores $121_{p,q}$ and $122_{p,q}$ will now be explained. The function of these control stores is to address the buffer store with an address comprised between 0 and [32(N/P−1]. Each word of control store $121_{p,q}$ is associated to a time slot in the supermultiplex highway $(31_p+41_p)$. Each word of control store $122_{p,q}$ is associated to a time slot in the supermultiplex highway $(31_q+41_q)$. The number of word locations in the buffer store is (32 N/P) while the number of time slots in the multiplex highways is 32 N. Therefore, it is not possible to rigidly assign a word location in the buffer store to a time slot in a multiplex highway. The assignment of a word location to a time slot must be a controlled assignment. The word location assignment is a stack assignment.

In order to fiw one's ideas, let us assume N=32. The double supermultiplex highways then have 2048 time slots. Further, let us assume that the following connections are already established:

time slot $\alpha_1=100$ to time slot $\beta_1=40$ through buffer store word location $\gamma_1=10$;

time slot $\alpha_2=200$ to time slot $\beta_2=20$ through buffer store word location $\alpha_2=0$;

time slot $\alpha_3=1000$ to time slot $\beta_3=10$ through buffer store word location $\gamma_3=120$;

The contents of control store $121_{p,q}$ is then the following:

word location 0 contains $\gamma_1=10$ (relative to communication $\alpha_1=100$ to $\beta_1=40$);

word location 1 contains $\gamma=0$ (relative to communication $\alpha_2=200$ to $\beta_2=20$);

word location 2 contains $\gamma_3=120$ (relative to communication $\alpha_3=1000$ to $\beta_3=10$).

The contents of control store $122_{p,q}$ is the following word location 0 contains $\gamma_3=120$ (relative to communication $\alpha_3=1000$ to $\beta_3=10$);

word location 1 contains $\gamma_2=0$ (relative to communication $\alpha_2=200$ to $\beta_2=20$);

word location 2 contains $\gamma_1=10$ (relative to communication $\alpha_1=100$ to $\beta_1=40$).

The reading out addressing of control store $121_{p,q}$ (or $122_{p,q}$) is controlled by binary counter $123_{p,q}$ (or $124_{p,q}$) which advances by one step each time $V_{p,q}$ ($V_{q,p}$) takes the value 1 and which is reset at the beginning of each frame.

The arrangement thus disclosed presents some complexity when an additional connection is to be established. Let us assume that one wishes to establish the new connection $\alpha_4=150$ to $\beta_4=8$ through word location $\gamma_4=5$ Then one must write in $121_{p,q}$ the following information:

word location 0 must contain $\gamma_1=10$ for $\gamma_1=100 \longleftrightarrow \gamma_1=40$ word location 1 must contain $\gamma_4=5$ for $\gamma_4=150 \longleftrightarrow \beta_4=8$ word location 2 must contain $\gamma_2=0$ for $\gamma_2=200 \longleftrightarrow \beta_2=20$ word location 3 must contain $\gamma_3=120$ for $\gamma_3=1000 \longleftrightarrow \beta_3=10$ and the following information is to be written in $122_{p,q}$:

word location 0 must contain $\gamma_4=5$ for $\gamma_4=150 \longleftrightarrow \beta_4=8$ word location 1 must contain $\gamma_3=120$ for $\gamma_3=1000 \longleftrightarrow \beta_3=10$ word location 2 must contain $\gamma_2=0$ for $\gamma_2=200 \longleftrightarrow \beta_2=20$ word location 3 must contain $\gamma_1=10$ for $\gamma_1=100 \longleftrightarrow \beta_1=40$ The words in the control store $121_{p,q}$ are written in the increasing order of the $\alpha$'s. The words in the control store $122_{p,q}$ are written in the incoming order of the $\beta$'s.

It appears in the given example that the establishment of a new communication generally imposes to shift an information which is the address of a word location in the buffer store from a word location to another word location of the control store. Thus the storing arrangement is before the establishment of the new communication

| address in central store $121_{p,q}$ | address in buffer store |
|---|---|
| 0 | 10 |
| 1 | 0 |
| 2 | 120 | after the establishment of the new communication

| address in control store $121_{p,q}$ | address in buffer store |
|---|---|
| 0 | 10 |
| 1 | 5 |
| 2 | 0 |
| 3 | 120 |

Figure 9:
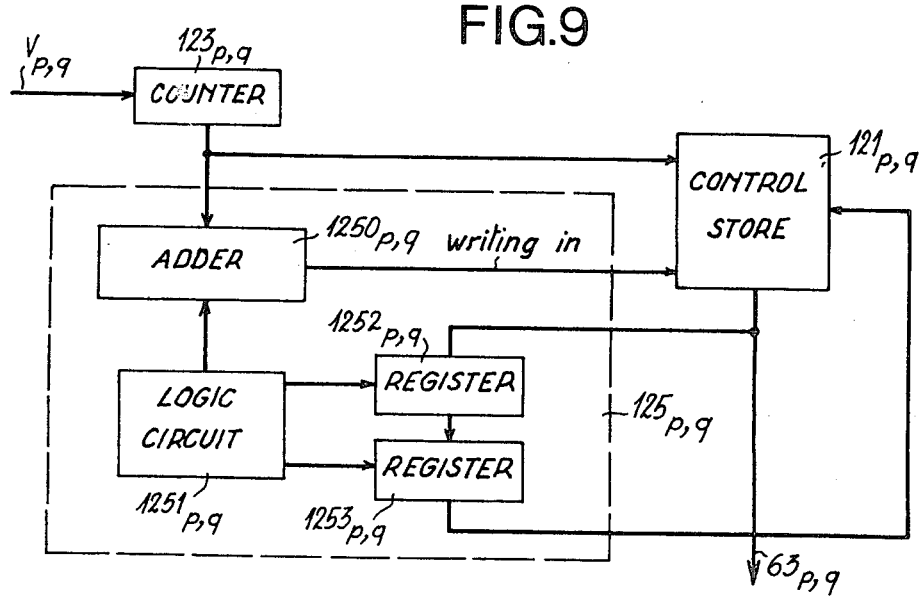
FIG. 9 represents a marker circuit.

The marker circuit $125_{p,q}$ is shown in FIG. 9. The marker circuit $126_{p,q}$ is identical to it. Marker circuit $125_{p,q}$ comprises two registers $1252_{p,q}$ and $1253_{p,q}$, an adder $1250_{p,q}$ and a combination logic $1251_{p,q}$. Adder $1250_{p,q}$ allows to decrement the value of counter $123_{p,q}$ by two units and the output of adder 1250 p,q controls writing into control store $121_{p,q}$.

Let us look back to the example given above in which the address sequence 10, 0, 120 must be replaced by the address sequence 10, 5, 0, 120.

The value $\gamma=5$ is written in register $1253_{p,q}$. During time slots 0 to 199, the operation of control store $121_{p,q}$ is in accordance with the operation disclosed above. During time slot 200, the contents of $121_{p,q}$ (which is $\gamma=0$) is transferred into $1252_{p,q}$ and addresses the buffer store $60_{p,q}$. Then the contents of $1253_{p,q}$ (which is $\gamma=5$)

is written into $121_{p,q}$ at address 1 given by $123_{p,q}$ in lieu of $\gamma=0$ which has been transferred to $1252_{p,q}$. During the other time slots, control store $121_{p,q}$ supplies the information for addressing $60_{p,q}$. Thus, the sequence 10, 5, 0, 120 at addresses 0, 1, 2, 3 of control store $121_{p,q}$ has been substituted for the sequence 10, 0, 120 at addresses 0, 1, 2. It must be well understood that this proceeding is necessary because the control store $121_{p,q}$ has 32 N/P addresses while the buffer store has 32 N addresses.

Figure 11:
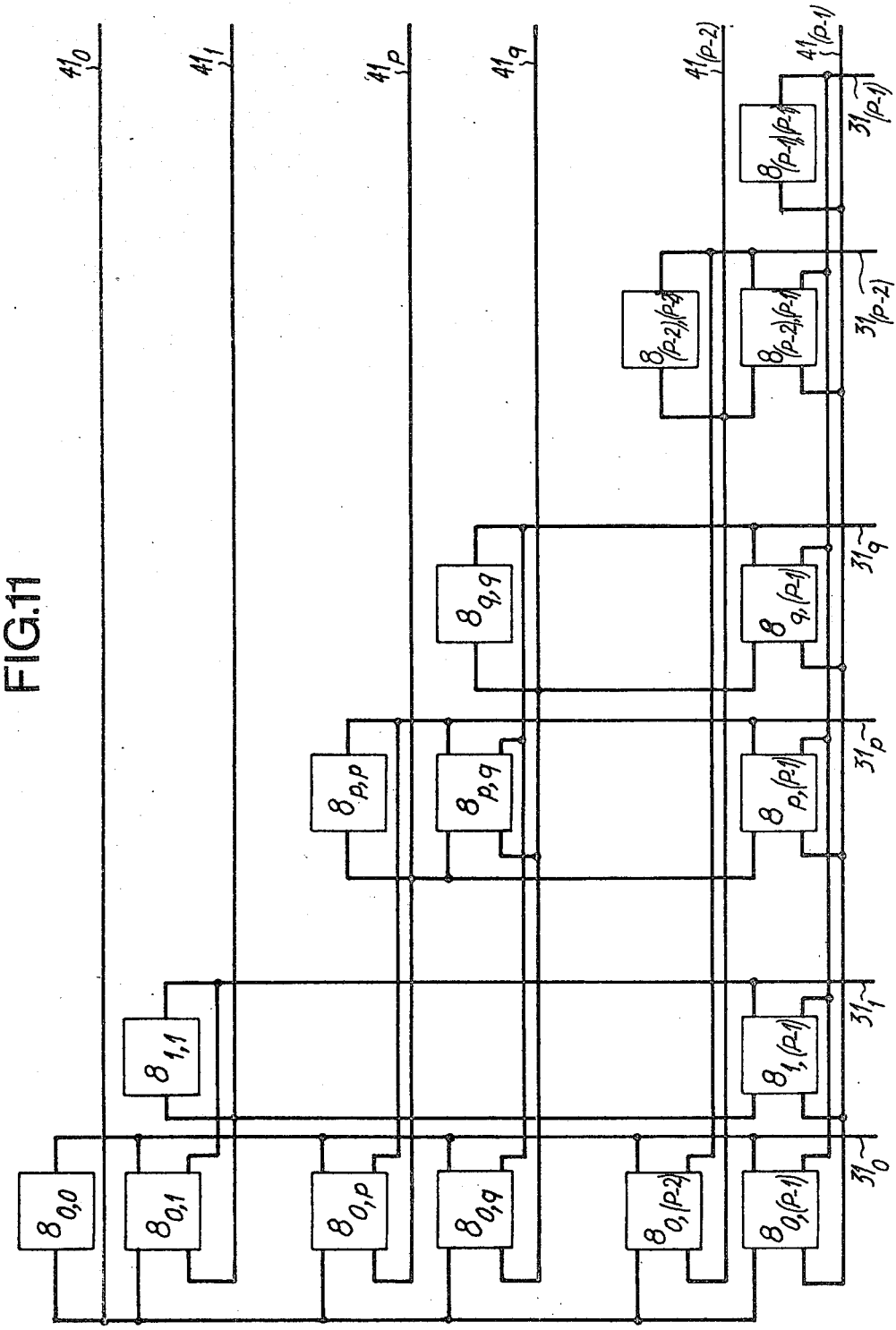
FIG. 11 represents an alternative embodiment of the switching network unit of FIG. 6.

Another embodiment of the switching network unit according to the invention is represented in FIG. 11. In this embodiment, the control modules $111_p$ and $111_q$ associated with the switching module $6_{p,q}$ and producing the switching fields $V_{p,q}$, $V_{q,p}$ are omitted.

Figure 12A:
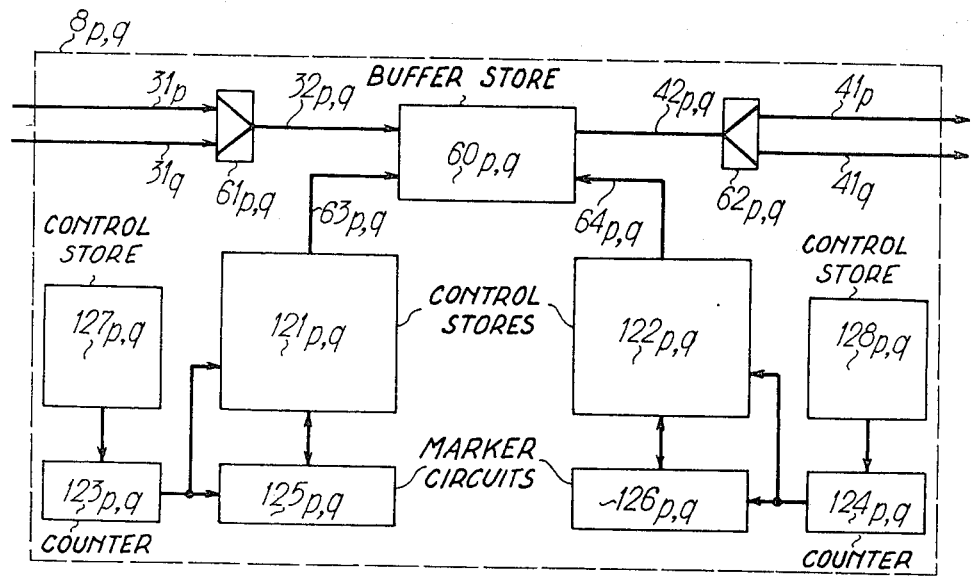
FIGS. 12A and 12B represent an alternative embodiment of the switching modules of FIGS. 10A and 10B.
Figure 12B:
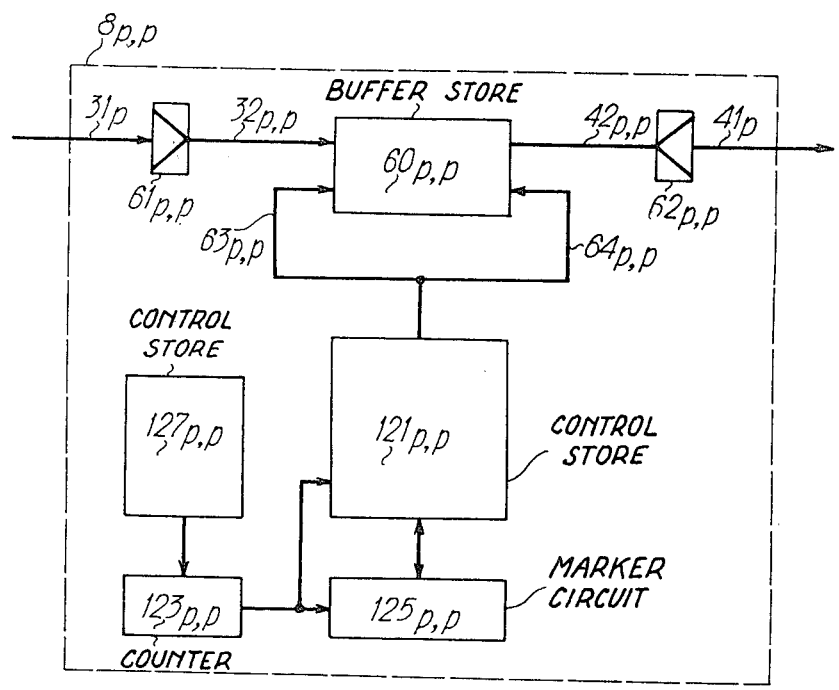

The switching modules 8 are represented in FIGS. 12A and 12B.

Switching modules $8_{p,q}$ comprises all the circuitry already disclosed with respect to switching module $6_{p,q}$ but has further two additional control stores $127_{p,q}$ and $128_{p,q}$ of each 32 N words of 1 bit which locally generate the informations $V_{p,q}$ and $V_{q,p}$. The operation of control module $8_{p,q}$ is exactly the same of control module $6_{p,q}$.

The control module $8_{p,p}$ of FIG. 12B comprises all the circuitry of control module $6_{p,p}$ plus a control store $127_{p,p}$ with 32 N words of 1 bit generating the information $V_{p,p}$.

Figure 13A:
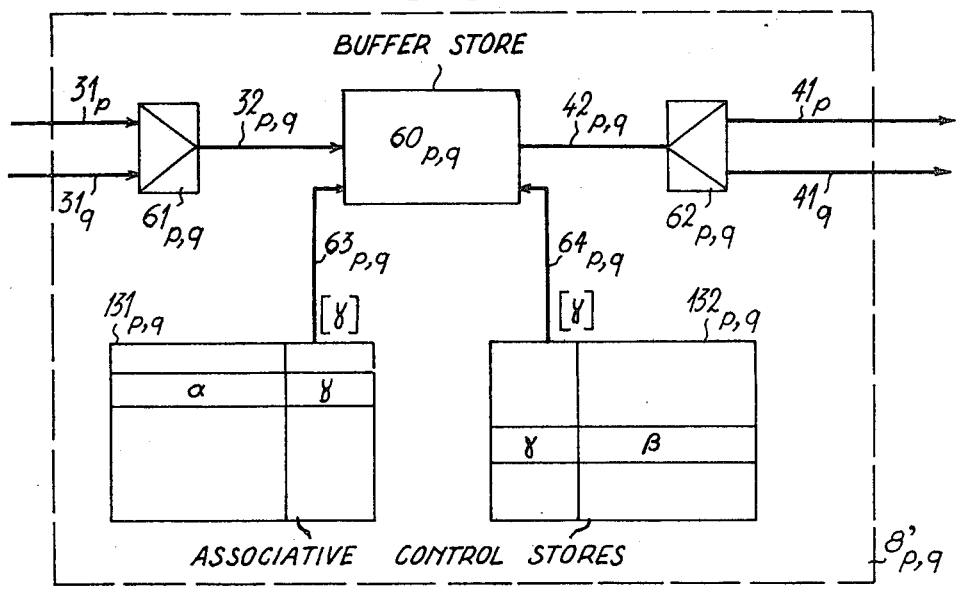
FIGS. 13A and 13B represent another alternative embodiment of the switching modules of FIGS. 10A and 10B.
Figure 13B:
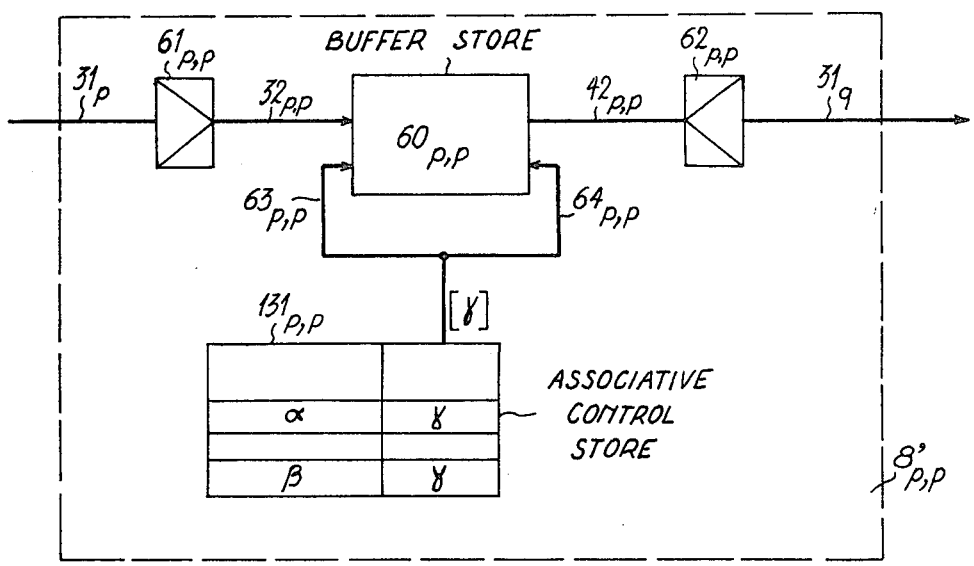

In FIG. 13A, the control module $8_{p,q}$ comprises buffer store $60_{p,q}$, supermultiplex highway selector and multiplexer $61_{p,q}$ and supermultiplex highway selector and demultiplexer $62_{p,q}$ as already represented in FIG. 12A and further two associative control stores $131_{p,q}$ and $132_{p,q}$ each having (32 N/P) word locations. As it is well known, an associative store is addressed by its contents. More previsely, control store $131_{p,q}$ is addressed by the numbers of the time slots which are written therein. Of course, as control store $131_{p,q}$ has (32 N/P) word locations and buffer store $60_{p,q}$ has 32 N word locations, only the time slots which are seized are written in control store $131_{p,q}$.

Control module $8_{p,p}$ is similar to control module $8_{p,q}$ but it only has a single associative control store $131_{p,p}$.

Figure 14:
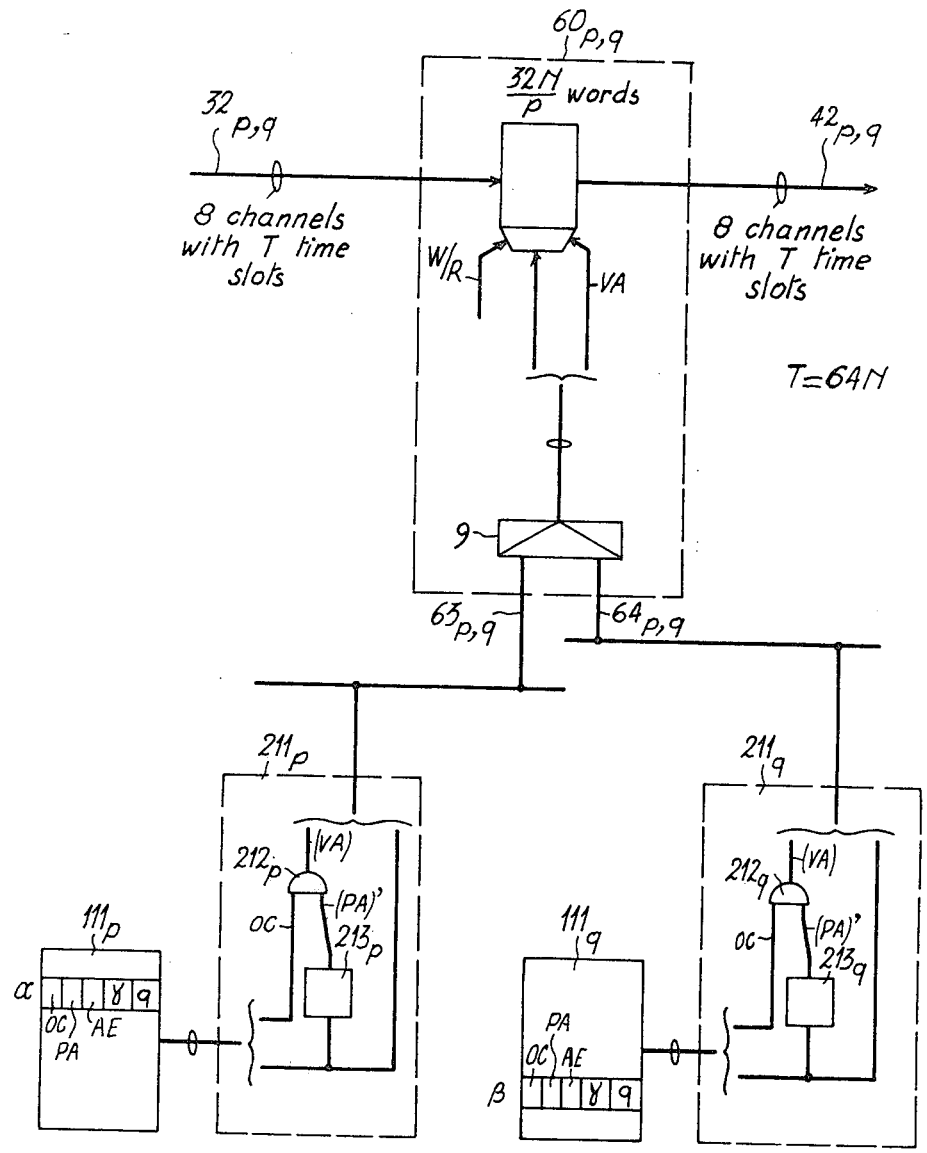
FIG. 14 represents a switching module and two control modules of a switching network unit of a type selectively allowing bidirectional, unidirectional and diffusion communications.

Referring now to FIG. 14, one finds again buffer store $60_{p,q}$, incoming double supermultiplex highway $32_{p,q}$, outgoing double supermultiplex highway $42_{p,q}$ and the control stores $111_p$ and $111_q$. A strobe and control device 211 is associated to each control store.

Each control word comprises three additional bits. The bit (OC) is a connection order, the bit (AE) is a writing in authorization and the bit (PA) is a parity bit. Each control word is checked by the strobe and control device. This device only transmits the address $\gamma$ to buffer memory $60_{p,q}$ if the parity is exact and if the (OC) bit is equal to 1.

The strobe and control circuit 211 comprises a parity checking circuit 213 and an AND-gate 212. The strobe and control circuit 211 generates an address validation bit (VA) when the connection order bit (OC) and the parity bit (PA) are coincident.

For establishment of a bidirectional connection $\alpha \longleftrightarrow \beta$ (FIG. 15A) i.e. the bidirectional connection between time slot i of incoming multiplex highway $IH_{n,p}$ and time slot j of outgoing multiplex highway $OH_{m,q}$ and between time slot j of $IH_{m,q}$ and time slot i of $OH_{n,p}$, the address $(\gamma,q)$ (address in the buffer store) is written at address $\alpha$ of control store $111_p$ and the address $(\gamma,p)$ (address in the buffer store) is written at address $\beta$ of control store $111_q$. The order connection bit (OC) and the writing in authorization bit (AE) are given the value 1 in both control stores $111_p$ and $111_q$.

For establishing an unidirectional connection $\alpha \longleftrightarrow \beta$ (FIG. 15B)

$(\gamma,q)$ is written at address $\alpha$ of $111_p$ and $(\gamma,p)$ is written at address $\beta$ of $111_q$, order connection bit (OC) and writing in authorization bit (AE) are both given the value 1 in control store $111_p$ and the respective values 1 and 0 in control store $111_q$.

For establishing a diffusion connection $\alpha \longleftrightarrow \beta,\beta',\beta''$ (FIG. 15C)

where $\beta$, $\beta'$, $\beta''$ are several time slots in the double supermultiplex highway $42_{p,q}$, the address $(\gamma,q)$ (in the buffer store) is written at address $\alpha$ of control store $111_p$ and the address $(\gamma,p)$ (in the buffer store) is written at addresses $\beta$, $\beta'$, $\beta''$ of the control store. Bits (OC) and (AE) are given the value 1 at address $\alpha$ of $111_p$ and bit (OC) is given the value 1 and bit (AE) the value 0 at addresses $\beta$, $\beta'$, $\beta''$ of $111_q$.

We claim:

1. Time division multiplex switching network unit for switching a time slot i assigned to a calling subscriber to a time slot j assigned to a called subscriber, said network unit comprising:

in an input stage, a plurality of P groups of N incoming multiplex highways and supermultiplexers multiplexing each of said multiplex highway groups into an incoming supermultiplex highway, said calling subscriber time slot i and called subscriber time slot j being included in said incoming multiplex highways and being respectively transferred by said supermultiplexers into time slots $\alpha$ and $\beta$ in said incoming supermultiplex highways;

in an output stage, a plurality of P outgoing supermultiplex highways and superdemultiplexers demultiplexing each of said outgoing supermultiplex highways into a plurality of N outgoing multiplex highways, the time slots $\alpha$ and $\beta$ being included in said outgoing supermultiplex highways and being respectively transferred by said superdemultiplexers into said calling subscriber time slot i and said called subscriber time slot j in said outgoing multiplex highways;

additional multiplexers selectively multiplexing two by two the P incoming supermultiplex highways and thereby providing a number of P(P+1)/2 incoming double supermultiplex highways, whereby one and the same among said incoming double supermultiplex highways contains both time slots $\alpha$ and $\beta$;

additional demultiplexers selectively demultiplexing two by two the P(P+1)/2 outgoing double supermultiplex highways, one and the same among said double supermultiplexing highways containing both the time slots $\alpha$ and $\beta$ and thereby providing a number of P outgoing supermultiplex highways;

P(P+1)/2 bidirectional buffer stores connected to said incoming and outgoing double supermultiplex highways;

P control stores associated with and respectively controlling P, (P−1), (P−2), . . . 2, 1 bidirectional buffer stores, said control stores including means for transferring the word contained in the word location of given address $\gamma$ in a buffer store associated with said control store into time slot $\alpha$ in an outgoing double supermultiplex highway; means for transferring the word contained in time slot $\alpha$ in an incoming double supermultiplex highway into the word location of address $\gamma$ in said buffer store; means for transferring the word contained in the word location of address $\gamma$ in said buffer store into time slot $\beta$ in said outgoing double supermultiplex highway; and means for transferring the word contained in time slot $\beta$ in said incoming double supermultiplex highway into the word location of address $\alpha$ in said buffer store.

2. Multiplex time division switching network unit as set forth in claim 1 in which the number of word locations in the buffer stores is half the number of time slots in the double supermultiplex highways.

3. Multiplex time division switching network unit as set forth in claim 1 in which the $P(P+1)/2$ bidirectional buffer stores have each a capacity of $aN/P$ word locations and the control stores having each a capacity of $aN$ word locations and have each access to P bidirectional buffer stores, where a is the number of time slots in a multiplex highway.

4. Time division multiplex switching network unit as set forth in claim 1 in which each bidirectional buffer store is controlled by a writing in and a reading out control stores, said writing in control store being associated with and having access to at most P buffer stores and said reading out control store being associated with and having access to at most P buffer stores, one of said buffer stores being a common buffer store accessible to both said writing in and reading out control stores, and which comprises means controlled by both said writing in and reading out control stores for assigning one and the same word location of address $\gamma$ in the common buffer store to the words in time slots $\alpha$ and $\beta$ of the incoming double supermultiplex highway connected to said bidirectional common buffer store.

* * * * *